US006835761B2

(12) United States Patent
Harrison

(10) Patent No.: US 6,835,761 B2
(45) Date of Patent: Dec. 28, 2004

(54) SOIL FORMULATION FOR RESISTING EROSION

(75) Inventor: Scott Harrison, Bakersfield, CA (US)

(73) Assignee: Terra Novo, Inc., Bakersfield, CA (US)

( * ) Notice: Subject to any disclaimer, the term of this patent is extended or adjusted under 35 U.S.C. 154(b) by 0 days.

(21) Appl. No.: 10/368,904

(22) Filed: Feb. 18, 2003

(65) Prior Publication Data

US 2003/0153647 A1 Aug. 14, 2003

Related U.S. Application Data

(63) Continuation of application No. 09/897,093, filed on Jun. 29, 2001, now Pat. No. 6,562,882.

(51) Int. Cl.$^7$ .................. C08K 17/20; C08K 17/32; C08K 17/52; C08K 1/00; C08K 33/26

(52) U.S. Cl. ................... 523/132; 524/13; 524/35; 524/831; 106/900

(58) Field of Search ................ 523/132; 524/13, 524/35, 831; 106/900

(56) References Cited

U.S. PATENT DOCUMENTS

| | | |
|---|---|---|
| 3,950,179 A | 4/1976 | Schneider |
| 3,959,975 A | 6/1976 | Graf |
| 3,971,222 A | 7/1976 | Griffith, Jr. |
| 4,001,033 A | 1/1977 | Anthone et al. |
| 4,022,633 A | 5/1977 | Schneider |
| 4,028,897 A | 6/1977 | Bennett |
| 4,071,400 A | 1/1978 | Jankowiak .................. 162/169 |
| 4,072,020 A | 2/1978 | Bishop ....................... 405/264 |
| 4,106,296 A | 8/1978 | Leonard, Jr. et al. |
| 4,107,112 A | 8/1978 | Latta et al. |
| 4,168,593 A | 9/1979 | Jankowiak |
| 4,243,563 A | 1/1981 | Ferm |
| 4,277,203 A | 7/1981 | Reed, Jr. et al. |
| 4,297,810 A | 11/1981 | Hansford |
| 4,417,992 A | 11/1983 | Bhattacharyya et al. ... 252/88.1 |
| 4,592,931 A | 6/1986 | Cargle |
| 4,606,675 A | 8/1986 | Mitani et al. |
| 4,669,920 A | 6/1987 | Dymond ..................... 405/264 |
| 4,705,816 A | 11/1987 | Pole |
| 4,797,145 A | 1/1989 | Wallace et al. |
| 4,799,549 A | 1/1989 | Vinot et al. |
| 4,826,350 A | 5/1989 | Kambe ......................... 404/27 |
| 4,941,924 A | 7/1990 | Merritt |
| 5,000,789 A | 3/1991 | Merritt |
| 5,012,974 A | 5/1991 | Johnson |
| 5,065,822 A * | 11/1991 | Miller et al. ................ 166/295 |
| D323,511 S | 1/1992 | Swisher, Jr. |
| 5,181,797 A | 1/1993 | Circeo, Jr. et al. |
| 5,209,768 A * | 5/1993 | Hughes ....................... 504/313 |
| 5,219,246 A | 6/1993 | Coutts et al. |
| 5,221,313 A * | 6/1993 | Mortvedt et al. .............. 71/63 |
| 5,336,315 A | 8/1994 | Cuscurida et al. |
| 5,364,206 A | 11/1994 | Marienfeld |
| 5,366,022 A | 11/1994 | Meyer et al. |
| 5,368,410 A | 11/1994 | Ferraiolo |
| 5,415,795 A | 5/1995 | Roe et al. ..................... 405/264 |
| 5,450,985 A | 9/1995 | Meuleman |
| 5,516,830 A | 5/1996 | Nachtman et al. ............ 524/466 |
| 5,567,087 A | 10/1996 | Theisen |
| 5,670,567 A | 9/1997 | Lahalih |
| 5,746,546 A | 5/1998 | Hubbs et al. |
| 5,770,639 A | 6/1998 | Ritter et al. |
| 5,779,782 A | 7/1998 | Spittle |
| 5,795,377 A | 8/1998 | Tanner et al. ............. 106/164.4 |
| 5,824,725 A | 10/1998 | Lahalih |
| 5,860,770 A | 1/1999 | Hunt ............................ 405/264 |
| 5,904,447 A | 5/1999 | Sutton et al. |
| 5,927,003 A * | 7/1999 | Miller et al. .............. 47/1.01 R |
| 5,942,029 A | 8/1999 | Spittle |
| 5,988,942 A | 11/1999 | Atkinson |
| 6,029,395 A | 2/2000 | Morgan |
| 6,042,305 A | 3/2000 | Novich |
| 6,071,411 A | 6/2000 | Grott |
| 6,076,997 A | 6/2000 | First et al. |
| 6,093,682 A | 7/2000 | Arendt et al. ................ 504/118 |
| 6,287,496 B1 | 9/2001 | Lownds |
| 6,360,478 B1 | 3/2002 | Spittle ............................ 47/9 |
| 6,395,051 B1 | 5/2002 | Arnold et al. |
| 6,397,519 B1 | 6/2002 | Snowden |
| 6,562,882 B2 * | 5/2003 | Harrison ..................... 523/132 |
| 6,589,442 B1 | 7/2003 | Wilson |
| 2001/0001634 A1 | 5/2001 | Gamliel et al. |
| 2001/0018047 A1 | 8/2001 | Rose et al. |
| 2002/0129544 A1 | 9/2002 | Bargiacchi |
| 2002/0132884 A1 | 9/2002 | Offerman |
| 2002/0188042 A1 | 12/2002 | Haile |
| 2003/0205072 A1 | 11/2003 | Van Der Merwe |

OTHER PUBLICATIONS

Perma–Zyme 11X; "The Most Effective Way to Stabilize Roads and Seal Ponds For Less Cost?"; 4 pages (undated).
Soil Science International, Inc.; "The Sensible Solution for Industrial Containment"; 4 pages (undated).
Engineered Polymer Solutions, Inc.; "Water Reducible Resing"; 3 pages (undated).
Engineered Polymer Solutions, Inc.; "High Solids and Coil Polyesters"; 4 pages (undated).
Material Safety Data, Sep. 5, 1997, Golden Gate Products, Davis, CA; 4 pages.
Fisch–Bond A Professional's Tackifier, Sep. 2002, Golden Gate Products, Davis, CA.; 3 pages.

(List continued on next page.)

Primary Examiner—Tae H. Yoon
(74) Attorney, Agent, or Firm—Stetina Brunda Garred & Brucker

(57) ABSTRACT

Compositions and method for resisting soil erosion. The compositions comprise either an aqueous mixture of a polymer mixed with an organic material or, alternatively, a polymer and organic material that can be mixed in water. The polymer preferably comprises polyacrylamide having anionic functional groups and the organic base comprises either cellulose, mulch and/or seed and mulch. The methods of the present invention comprise providing or forming an aqueous mixture of the compositions of the present invention and applying them to an area of land sought to be provided with soil erosion resistance.

47 Claims, No Drawings

OTHER PUBLICATIONS

Golden Seal, Cross Linked Polymer Tackifier, Golden Gate Products, Davis, CA.; 2 pages.

Aquashed–ADC Material Safety Data Sheet, Aug. 31, 1997, Aqua–Shed Technologies, Inc., Florence, SC.; 4 pages.

EARTHbound Erosion Control Agent and Mulch Tackifier, Earth Chem, Inc., Fort Collins, CO.; 6 pages.

Earthguard Mixing Instructions, Telfer Geosynthetics, Pittsburgh, CA.; 1 page.

Slicky Sticky, Lower Costs—Better Results, James Lincoln Corporation, Rowlett, TX.; 3 pages.

Finn E–Tack, For Normal to Moderate Slope Conditions, Apr. 6, 2000, Material Safety Data Sheet, U.S. Dept. of Labor Occupational Safety and Health Administration; 3 pages.

Jetwet–HL, Liquid Polymer, Poulenger USA, Inc. Lakeland, FL.; 1 page.

Hedro Seed Kit 2.5, Material Safety Data Sheet, Jan. 1, 2000, Poulenger, USA, Inc., Lakeland, FL.; 4 pages.

Research & Case Studies, Conwed Hydro–Mulch 3000 Captive Caribou Toxicity Test, www.conwedfibers.com/documentation/tests/caribou.html printed Jul. 29, 2003, Washington State University, Natural Resource Sciences, Pullman, WA.; 2 pages.

Hydromulch 3000 Mechanically–Bonded Fiber Matrix, www.conwedfibers.com/mbfm/index.html, printed Jul. 29, 2003, 3 pages.

Hydraulic Mulch Additives, Dye Crystals, www.conwedfibers.com/additives/dye_crystals.html, printed Jul. 29, 2003, 2 pages.

Kate Goff, Research & Case Studies, Project Profile: "Quanartine Landfill", Erosion Control Magazine, www.conwedfibers.com/documentation/cases/quarantine_hill . . . , printed Jul. 29, 2003, 4 pages.

Optimizations for Improved Performance, Cost Reduction, and Environmental Risk Management, Applied Polymer Systems, Inc., Norcross, GA., 10 pages.

APS 600 Series Silt Stop, Polyacrylamide Erosion Control Emulsion, Applied Polymer Systems, Inc., Norcross, GA, 3 pages.

APS 700 Series Silt Stop, Polyacrylamide Erosion Control Powder, Applied Polymer Systems, Inc., Norcross, GA, 3 pages.

Hydropam Tackifier for Maximizing Plant Establishment, Material Safety Data Sheet, U.S. Department of Labor, OSHA, Jan. 15, 1997, 4 pages.

Earth Bond, A Tackifier for the Professional Hydroseeder, J & J Enterprises, Orono, ME; 2 pages.

Standard Specification for Hydraulically Applied Fiber Mulches, Annual Book of ASTM Standards, vol. 4.08, 4.09, 2 pages.

Dale Gadd, Hydraulic Planting Technology, Golf Course Management, Aug. 1990, 4 pages.

Miller, Stanley and Terry Howard, Repairing Landslides with Geotechnical and Erosion Control Tools, Erosion Control, Jun. 1999, page. 43–50.

Staib, Bob, Soil Fertilizers: Fertilizing for Rapid Revegetation and Sustained Growth, Land and Water, Mar./Apr. 2000, 2 pages.

Tilton, Joseph Lynn, Hydroseeding, the Cost–Effective Answer to Erosion Control; Erosion Control; Mar. 2000, pp. 52–63.

Fiberwood Hydroseeding Mulch Application and Coverage Table, 1 page.

Trott, John, Hydraulic Seeding & Stabilization; Erosion Control; Nov./Dec. 2000, pp. 56–61.

Specifiers' Guide to Hydraulic Planting & Mulches; Weyerhaeuser, Tacoma, WA, 7 pages.

Three options you can use to conquer any landscaping challenge; Central Fiber Corporation, Wellsville, KS, 1 page.

It's a Natural; Agri–Fiber, recycled fiber mulch; GreenStone Industries Sacramento, CA, 4 pages.

Product Information Guide; Mat, Inc. Floodwood, MN, 2 pages.

Salmon–Lost Trail; Erosion Control; Jun. 1999, pp. 66–67.

Engineering Fibers to Fix Erosion Problems; Erosion Control; Mar. 2000, p. 25–26.

Tobiason, Scott, David Jenkins, Ed Molash, Stacey Rush; Polymer Use and Testing for Erosion and Sediment Control on Construction Sites; Erosion Control, Jan./Feb. 2001, pp. 90–101.

O'Malley, Penelope, Slope Stabilization; Erosion Control, Jul./Aug. 1996, pp. 66–77.

Hager, Mary Catherine, Reclaiming Coal–Mining Sites; Challenges in Erosion Control; Erosion Control; Jul./Aug. 2001, pp. 48–53.

Project Profile Amazon Creek: Restoration of a Wetland; Erosion Control, Apr. 2000, p. 28–29.

Green, V.S. et al, Effect of Different Polyacrylamide Configurations on Soil Crust Formation; Abstract; Purdue University, Department of Agronomy, West Lafayette, IN, pp. 505–506.

Orts, William et al.; Preventing Soil Erosion with Polymer Additives; Abstract; Polymer News; p. 406–413; vol. 24, No. 12.

Lentz, R.D. et al; Influence of Polymer Charge Type and Density of Polacrylamide Ameliorated Irrigated Furrow Erosion; Abstract; U.S. Dept. of Agriculture, Agricultural Research Service, p. 161–168; Kimberly, ID.

Encyclopedia of Polymer Science and Engineering; vol. A to Amorphous Polymers; p. 169–211; A Wiley–Interscience Publication, John Wiley & Sons, New York, N.Y.

Straw & Fiber Mulch Binders; www.terra–mulch.com/binders/tacking; website printout Jul. 27, 2003, 2 pages.

Resource Center; www.terra–mulch.com/resources_cases; website printout Jul. 27, 2003, 6 pages.

Polyacrylamides: How Do They Work?; Soil and Water Conservation Society newsletter RUNOFF; Winter 1997, 2 pages.

Slope Stabilization: Gale Ranch Slope Stabilization; Land and Water; Nov./Dec. 2001; p. 28–29.

Urroz, Gilberto E.; Test of CONWED BFM 3000 with and without fiber, and a competitive BFM for Erosion Control and Plant Growth Enhancement Under Simulated Rain and Sunlight; Jul. 1998; Utah State University, Logan, UT, 16 pages.

Sojka, R.E. et al.; Polyacrylamides in Irrigated Agriculture—Final Report; Jun. 2000; National Program for Irrigation Research and Development, Kimberly, ID. 32 pages.

Polyacrylamide as a Soil Stabilizer for Erosion Control—Final Report No. WI 06–98; Jan. 2001; Wisconsin Department of Transportation; 29 pages.

Stormwater Management Plan; Mar. 25, 1997; vol. 5.3; Washington State Department of Transportation; 21 pages.

Erosion Control Product Acceptability Lists (PAL) for Multi–Modal Applications; Jan. 2001 Edition; Wisconsin Department of Transportation; 30 pages.

Manual for Erosion and Sediment Control in Georgia; Fifth Edition 2000; Georgia Soil and Water Conservation Commision; Athens, GA; 15 pages.

Terra–Mulch Poly–Fibres Material Safety Data Sheet; The Spittle Company, Cornelius, NC.; 2 pages.

CF2000 Polymer Slope Erosion Control; Construction Fabrics & Material Corporation; Cottage Grove, WI; 2 pages.

Swerin, Agne; Dissertation for the degree of Doctor of Technology performed at STFI; Feb. 16, 1995; 40 pages.

Swerin, Agne; Flocculation and fibre network strength in papermaking suspensions flocculated by retention aid systems; Royal Institute of Technology; Stockholm, Sweden; 1995; pp. 32–62.

Swerin, Agne; Flocculation of cellulosic fibre suspensions by model microparticulate retention aid systems; Swedish Pulp & Paper Research Institute, Stockholm, Sweden; pp. 65–75.

Swerin, Agne; Flocculation of cellulosic fibre suspensions by a microparticulate retention aid system consisting of cationic polyacrylamide and anionic montmorillonite; Swedish Pulp & Paper Research Institute, Stockholm, Sweden; pp. 77–101.

Swerin, Ange; Linear and nonlinear dynamic viscoelasticity of pulp fiber suspensions; Swedish Pulp & paper Research Institute; Stockholm, Sweden; pp. 173–180.

Swerin, Agne; Shear strength in papermaking suspensions flocculated by retention aid systems; Swedish Pulp & Paper Research Institute, Stockholm, Sweden; pp. 217–234.

Manual for Erosion and Sediment Control in Georgia, Manual, Title Pages, iii–viii, 2–7, 6–5, 6–6, 6–41 to 6–43, 6–67 to 6–68, 6–73, Jan. 1, 2000.

EARTHbound, Erosion Control Agent and Mulch Tackifier, Brochure, 8 Pages, 1999.

Great Western Chemical Co., EARTHbound Letter and Brochure, 9 Pages, Jun. 23, 1998.

Soilfix Polybead, Ciba Speciality Chemicals, Brochure, 2 pages, 2000.

Golden Gate Products, Labels and Brochure, Review State of California, Fischbond, 11 Pages, Oct. 2, 1997.

Directions for Use #46, BioPam PHC Royalty Corps. Directions for Use, Jan. 1999.

J & J Enterprises, Letter and Brochure, 2 Pages, Oct. 6, 1994.

Hydropam, Stockhausen, Brochure and M.S.O.S., 4 Pages, 1997.

Printout of website: www.dot.state.tx.us/insdtdot/orgchart/cmd/erosion/sect3.htm "Erosion Control Report" pp. 1–17.

Texas Department of Transportation 1999 Evaluation Cycle; Class I "Slope Protection" Applicatons of EarthBound; Jun. 30, 2000; 4 pages.

New York State Department of Transportation; Standard Specification Section 612–Sodding & Placing Erosion Control Materials and 713–07 Erosion Control Materials; Jun. 23, 1998. 10 pages.

website printout: http://hazard.com/msds/mt/cyanamid/files/249; dated Jul. 10, 2002; 6 pages.

Rosa–Espinosa, et al.; Sediment and Runoff Control on Construction Sites Using Four Application Methods of Polyacrylamide Mix; 1999; 8 pages.

Erosion & Sediment Control Technical Bulletin #2; Anionic Polyacrylamide Guidance; Jul. 2002; 7 pages.

website printout: http://www.copa.org/2001/11–final/part11.html: Lemon Lane Final Report; Jun. 2001; 5 pages.

website printout: http://kimberly.ars.usda.gov/sojka/pamphlet.html; Sojka, et al.; The PAMphlet; Feb. 19, 2001; 5 pages.

Stormwater Management: Pinellas County Leads the Way; Land and Water; Jan./Feb. 2002; p. 50–51.

Tilton, Joseph Lynn; Winning Hydroseeding Strategies; Erosion Control; May/Jun. 2002; pp. 40–49.

Brzozowski, Carol; Carpets of Grass; Erosion Control; Jan./Feb. 2003; pp. 24–31.

Hager, Mary Catherine; Reclaiming Coal–Mining Sites; Challenges in Erosion Control; Erosion Control; Jul./Aug. 2001; pp. 48–53.

Tilton, Joseph Lynn; Giving Seeds a Better Bed; Erosion Control; Mar./Apr. 2002; pp. 30–37.

Hydroware, Hardware for Hydroseeders (catalog); Linwood Supply; Jan. 1998; 12 pages.

Bowie Hydro–Mulcher catalog; 3 pages.

Model T60 Series II HydroSeeder; brochure; FINN Corporation; Copyright 1997.; 2 pages.

Reinco (equipment and products catalog); Plainfield, NJ; 8 pages.

San Diego State University Soil Erosion Research Laboratory, "Results from a Study of EarthGuard HM Hydraulic Matrix for Soil Stabiization: Runoff Characteristics and Sediment Retention Under Simulated Rainfall Conditions", Dec. 18, 2000, 14 pages, SDSU/SERL, San Diego, California.

San Diego State University Soil Erosion Research Laboratory, "Results from a Study of EarthGuard Fiber Matrix for Soil Stabiization: Runoff Characteristics and Sediment Retention Under Simulated Rainfall Conditions", Oct. 14, 2002, 15 pages, SDSU/SERL, San Diego, California.

Trenkel, Jan et al., PAM and/or Low Rates of Straw Furrow Mulching to Reduce Soil Erosion and Increase Water Infiltration in a Furrow Irrigated Field, 1995 Trial, Malheur Experiment Station, Oregon State University, 10 page printout from website at www.cropinfo.net Mar. 11, 2003.

"Profile Products—Wood Cellulose w/Tack III—Tackifier—Hydraulic Mulches", Profile Products, LLC, Buffalo Grove, Illinois, 11 page website printout from www.terra-mulch.com, Mar. 11, 2003.

Roa–Espinosa, A. et al., Sediment and Runoff Control on Construction Sites Using Four Application Methods of Polyacrylamide Mix, National Conference on Tools for Urban Water Resource Management and Protection, Chicago, Feb. 7–10, 2000, pp. 278–283, University of Wisconsin.

Storey, B.B., et al., Compost and Wood Chips with Tackifier for Erosion Control, Abstract 62, reprinted from Williams, James R., etc., The Sixth International Symposium on Environmental Concerns in Rights–of–Way Management, Copyright 1997, with permission from Elsevier Science.

Land and Water, Company Listings, Nov./Dec. 1992 p. 47 with 4 pages of miscellaneous product information for EXACT–TAC.

Land and Water, Nov./Dec. 1992 p. 15 advertisement regarding "Soil Seal" acrylic tackifier for mixture with seed, mulch, fertilizer, and water.

* cited by examiner

SOIL FORMULATION FOR RESISTING EROSION

This application is a continuation of application Ser. No. 09/897,093 filed Jun. 29, 2001, now U.S. Pat. No. 6,562,882.

BACKGROUND OF THE INVENTION

Soil erosion, namely, the detachment of particles of soil and surficial sediments and rocks, is a serious problem recognized worldwide. Essentially, erosion occurs via the forces of wind and water that facilitate the movement of topsoil from one place to another. Of such forces, water erosion is generally considered more detrimental to soils both by the volume of soil removed, and the area of land influenced. Moreover, although soil erosion can potentially occur in any land surface, sloping areas mantled with soil or loose sediment are particularly susceptible to such forces. Indeed, current data seems to suggest that in the United States, soil has recently been eroded at about seventeen times the rate at which it forms. Further data suggests that soil erosion rates in Asia, Africa and South America are about twice as high as that in the United States.

Due to its significance, several attempts have been made to prevent or substantially reduce soil erosion. Among the more well-known of such methods include agricultural practices, such as contour farming and terracing, no-till cultivation, strip farming and polyvarietal cultivation. Other well-known approaches include adding organic matter to soil which, by biochemical degradation, produces polysaccharides that are cohesive in nature and act to cause soil particles to stick together and resist erosion. Along these lines, products have been introduced to provide at least temporary erosion control, particularly with respect to slopes and the like until such time as trees and vegetation can take root to resist erosion. Such products include bonded fiber matrices, such as Soil Guard® produced by Mat Inc., of Floodwood, Minn., which comprises a continuous layer of elongated fiber strands held together by a water-resistant bonding agent. Such product is operative to eliminate direct raindrop impact on soil and further includes high water-holding capacity that eventually biodegrades into plant nutrients.

Such products, however, are of limited effectiveness and often do not provide the degree of soil erosion resistance as is typically desired, particularly for use in relation to man-made slopes and terraces in arid regions, such as southern California and Arizona. Such lack of effectiveness can and does often affect residential and commercial property development where man-made slopes are developed to support such structures and the like. In this regard, inadequate soil erosion resistance can culminate in the destruction of condemnation of buildings and dwellings, as well as create substantial storm water pollution. Moreover, such matrices can inhibit new plant growth by acting as a barrier against proper germination.

Accordingly, there is a substantial need in the art for a composition and method that is operative to resist soil erosion to a much greater degree than prior art compositions and methods. There is further need in the art for such compositions and methods that are non-toxic, biodegradable, can be readily deployed utilizing existing, commercially-available application techniques, and acts to serve as a soil conditioner. Still further, there is a need in the art for such a composition and method that is of simple formulation, relatively inexpensive to produce, and utilizes known, commercially-available materials.

BRIEF SUMMARY OF THE INVENTION

The present invention specifically addresses and alleviates the above-identified deficiencies in the art. In this regard, the present invention is directed to compositions and methods for eliminating or substantially reducing soil erosion. According to the preferred embodiment, the composition comprises either an aqueous mixture of an organic material, which may comprise cellulose, mulch or a combination seed and mulch and a hydrophilic polymer, the latter of which preferably comprises polyacrylamide or a mixture of polyacrylamide and sodium acrylate. Preferably, the polyacrylamide is provided with anionic functional groups. The soil erosion resisting composition may further be provided in the form of a reconstitutable powder or liquid concentrate comprised of the organic material mixed with polyacrylamide. In the latter embodiment, such composition is formulated such that the polyacrylamide is present in an amount ranging from 0.25 to 5% by weight of said composition and said organic base comprises the remaining 95.00 to 99.75% of the composition weight. To reconstitute the composition, the same is preferably mixed with water in a ratio of one pound organic base/polymer per one and one-half gallons of water to one pound organic matter/polymer to six gallons of water. In further refinements of the invention, the polymer component may comprise Earth-Guard® soil-erosion resistant products produced by Terra Novo, Inc. of Bakersfield, Calif.

As to the methods of the present invention, the same essentially comprise providing an erosion-resistant composition of the aforementioned variety and applying the same to an area of land sought to be treated to consequently resist soil erosion. According to the preferred embodiment, the method comprises forming a first admixture of water and polymer, and thereafter adding the organic material to form a second admixture. The resultant admixture may be hydraulically applied, as per conventional soil erosion resistant compositions, such as bonded fiber matrix. Advantageously, the application of the compositions of the present invention are effective immediately upon application in resisting soil erosion and are non-toxic and biodegradable. Moreover, such methods can be practiced in any kind of weather and on any kind of soil, and is especially well-suited for use on slopes and the like.

It is therefore an object of the present invention to provide compositions and methods for resisting soil erosion that can resist soil erosion to a far greater degree than prior art compositions and methods, particularly in relation to slopes and the like.

Another object of the present invention is to provide a composition and method for resisting soil erosion that is non-toxic, biodegradable and safe for the environment.

Another object of the present invention is to provide a composition and method for resisting soil erosion that is of simple formulation, relatively inexpensive, and can be readily applied utilizing conventional application equipment and techniques.

Still further objects of the invention are to provide a composition and method for resisting soil erosion that is effective immediately upon application, can be applied in any type of weather, and can be utilized on virtually any type of soil.

DETAILED DESCRIPTION OF THE INVENTION

The detailed description as set forth below in connection with the appended drawings is intended as a description of the presently preferred embodiments of the invention, and is not intended to represent the only form in which the present invention may be constructed or utilized. The description sets forth the functions and sequences of steps for constructing and operating the invention in connection with the illustrated embodiments. It is understood, however, that the same or equivalent functions and sequences may be accomplished by different embodiments and that they are also intended to be encompassed within the scope of this invention.

The present invention is directed to compositions and methods for preventing or substantially reducing soil erosion. With regard to the compositions, there is provided the combination of a polymer and an organic material that, in use, are mixed with water to form an aqueous admixture. In this respect, the compositions of the present invention may comprise either the polymer/organic material elements alone, which may be mixed with water, or, alternatively, an aqueous solution containing such components.

With respect to the former, the polymer element comprises polyacrylamide. Such polymer, which is well-known in the art, comprises $CH_2$:$CHCONH_2$ linear polymers polymeric through the vinyl groups. Preferably, the polyacrylamide is formulated such that the functional groups thereof are anionic and, hence, converted into polyelectrolytes. It should be understood, however, that cationic functional groups are contemplated as falling within the scope of the present invention. In a more highly refined embodiment, the polymer component comprises a copolymer mixture of acrylamide and sodium acrylate, present in a ratio of approximately 70:30, that is commercially available and sold under the trademark EarthGuard® by Terra Novo, Inc. of Bakersfield, Calif. As to the organic material, the same preferably comprises either cellulose, mulch and/or seed and mulch. With respect to the latter components, the same are well-known in the art. In this regard, such component may include materials such as recycled paper mulch and/or wood fiber mulch, among several other organic materials.

The basic aforementioned components that comprise the invention, by percent weight with regard to the reconstitutable mixture, encompass the following ranges:

| COMPONENT | PERCENT BY WEIGHT |
|---|---|
| Polymer | 0.25% to 5.00% |
| Organic Material | 99.75% to 95.00% |

It is understood that the percentages of the two components above will total 100% by weight and if other materials are included in the concentrate formulation, the percentages of all ingredients will total 100% by weight.

In a more highly refined embodiment, the composition comprises the mixture of a polymer present in an amount of approximately 1.25% by weight and the organic material in an amount of 98.75% by weight. Again, to the extent additional materials are included, the percentages of all ingredients will total 100% by weight.

For application, the polymer/organic composition will be mixed with water. To that end, it is contemplated that water may be added in the amount of one and one-half to six gallons per pound of polymer/organic material. Generally, it is contemplated that a minimum application will include five hundred pounds of polymer/organic material mixed with three thousand gallons for distribution per acre. On the other hand, to the extent a maximum amount of soil erosion protection is desired, the compositions of the present invention may be applied such that one ton of polymer/organic material per three thousand gallons of water will be applied per half acre.

In further refinements of the invention which incorporate the use of EarthGuard® as the polymer component, there is set forth below in Table 1 general application rates to provide seasonal erosion control for slopes having the specified degree of inclination. Such application rates are per acre and specifically contemplate mixture with 3000 gallons of water for use on loamy soils that are balanced in organic matter and nutrients, with maximum rainfall of twelve to fifteen inches over a four to five month period.

| Slope Gradient | 6:1 | 5:1 | 4:1 | 3:1 | 2:1 | 1.5:1 | 1:1 |
|---|---|---|---|---|---|---|---|
| Gals of Earth-Guard ®/ Acre | 4 | 5 | 6 | 7 | 8 | 9 | 10 |
| (lbs) Mulch/ Acre | 800–1,000 | 800–1,000 | 1,000–1,200 | 1,200–1,500 | 1,500–2,000 | 1,500–2,000 | 2,000–2,500 |

To the extent it is desired to impart soil erosion resistance in the spring with some rain still expected, Table 2 sets forth herebelow general rate guidelines for such applications, again contemplating per acre application with mixture with 3000 gallons of water.

| Slope Gradient | 6:1 | 5:1 | 4:1 | 3:1 | 2:1 | 1.5:1 | 1:1 |
|---|---|---|---|---|---|---|---|
| Gals of Earth-Guard ®/ Acre | 2 | 3 | 4 | 5 | 6 | 7 | 8 |
| (lbs) Mulch/ Acre | 800–1,000 | 800–1,000 | 1,000–1,200 | 1,200–1,500 | 1,500–2,000 | 1,500–2,000 | 2,000–2,500 |

With respect to application, the same may be applied by any of a variety of techniques known in the art. For example, the compositions of the present invention may be applied via hydroseeders, among others well-known in the art. As will be appreciated by those skilled in the art, in light of the compositions of the present invention including a high amount of polyacrylamide and/or polyacrylamide and sodium acrylate, the resultant admixture produced by adding the aqueous component with the polymer/organic material will consequently produce a gel or slurry that will require constant agitation, such as through the use of agitators and the like, or by thorough mixing at the time such ingredients are in contact with one another. With respect to the latter, it is currently contemplated that the polymer component, at a minimum, must be added directly to the still water flow and thereafter the mixture is circulated for a minimum of ten minutes prior to application of the resultant admixture.

Advantageously, the compositions of the present invention are non-toxic, biodegradable and can be applied to any types of soils in any type of weather conditions. Moreover, in studies involving the aforementioned compositions, the same were shown to reduce erosion and sediment runoff by approximately 95% when compared to untreated soil conditions. As is known in the art, such reduction in sediment runoff is comparable, if not better, to the best performing best management practices known in the art. Moreover, by simply using well-known and commercially available materials, in particular the polymer component of the present invention, the compositions and methods of using the same according to the present invention are substantially more cost effective than prior art compositions and methods. Along these lines, based upon current economic analysis, it is believed that use of the compositions and methods of the present invention are anywhere from one-half to one-fifth of the cost of prior art erosion control products, namely, rolled erosion control products and bonded fiber matrices.

Additional modifications and improvements of the present invention may also be apparent to those of ordinary skill in the art. Thus, the particular combination of parts and steps described and illustrated herein is intended to represent only certain embodiments of the present invention, and is not intended to serve as limitations of alternative devices and methods within the spirit and scope of the invention.

What is claimed is:

1. A method for reducing soil erosion from an area of land comprising the steps:
    a) providing a copolymer of linear polyacrylamide and sodium acrylate;
    b) providing an organic material selected from the group consisting of paper mulch, wood fiber mulch, and cellulose;
    c) providing approximately 3000 gallons of water;
    d) mixing said water in step c) with said copolymer in step a) to form a first admixture;
    e) mixing the admixture of step d) with said organic material in step b) such that the copolymer is present in an amount from 0.25% to 5.00% by weight of the combined weight of said copolymer and said organic material, said organic material weighting at least 1000 pounds; and
    f) applying said admixture in step e) to approximately one acre of land, said land having a slope gradient ranging from 6:1 to 1:1.

2. The method of claim 1 wherein in step e), said copolymer is present in an amount from 0.25% to 1.25% by weight of the combined weight of said copolymer and said organic material.

3. The method of claim 1 wherein in step b), said organic material is selected from the group consisting of cellulose and mulch.

4. The method of claim 3 wherein said mulch is selected from the group consisting of paper mulch and wood fiber mulch.

5. The method of claim 1 wherein in said step f) is accomplished via a hydroseeder.

6. A method for reducing soil erosion from an area of land comprising the steps:
    a) providing a copolymer consisting of linear polyacrylamide polymer and sodium acrylate;
    b) providing an organic material selected from a group consisting of paper mulch, wood fiber mulch, and cellulose;
    c) providing approximately 3000 gallons water;
    d) mixing said water in step c) with said copolymer in step a) to form a first admixture;
    e) mixing the admixture of step d) with said organic matter in step b) such that a second admixture is formed wherein:
        i) said copolymer is present in an amount from 025% to 1.25% by weight of the combined weight of said copolymer and said organic material; and
        ii) the weight of the organic material ranges from approximately 1000 pounds to one ton; and
    f) applying said admixture in step e) to an area of land having a size ranging from one-half acre to one acre.

7. A method for reducing soil erosion from an area of land comprising the steps:
    a) providing a copolymer consisting of linear polyacrylamide and sodium acrylate;
    b providing an organic material selected from a group consisting of paper mulch, wood fiber mulch, and cellulose;
    c) providing water;
    d) mixing said water with said copolymer in step a) and; said organic matter in step b) such that an admixture is formed wherein:
        i) said copolymer is present in an amount between 0.25% and 1.25% by weight of the combined weight of said copolymer and said organic material, said organic material weighing at least 800 pounds; and
        ii) the ratio of water to the combined weight of the copolymer and organic material ranges from at least approximately 802 pounds to one ton of copolymer and organic material per 3,000 gallons of water; and
    e) applying said admixture in step e) to an area of land having a size of approximately one acre.

8. A method for reducing soil erosion from an area of land comprising the steps:
    a) providing a linear polyacrylamide polymer;
    b) providing an organic material selected from a group consisting of paper mulch, wood fiber milch, and cellulose;
    c) providing approximately 3000 gallons of water;
    d) mixing said water in step c) with said polymer in step a) to form a first admixture;
    e) mixing the admixture of step d) with said organic matter in step b) such that a second admixture is formed:
        wherein said polymer is present in an amount from 0.25% to 5.00% by weight of the combined weight of said copolymer and said organic material, said organic material weighing between at least 1000 to 2000 pounds; and
    f) applying said admixture in step e) to an area of land having a size ranging from one-half acre to one acre.

9. The method of claim 2 wherein in step e), said organic material weighs between 1,000 pounds and one ton.

10. The method of claim 9 wherein in step f), said slope gradient ranges from 5:1 to 1:5:1.

11. The method of claim 10 wherein in step f), said slope gradient ranges from 4:1 to 2:1.

12. The method of claim 11 wherein in step e), said organic material weighs between 1200 pounds to one ton.

13. The method of claim 12 wherein in step e), said organic material weighs between 1200 pounds and 1500 pounds; and wherein in step f), said slope gradient is approximately 3:1.

14. The method of claim 10 wherein in step e), said organic material weighs between 1500 pounds and one ton and wherein in step f), said slope gradient ranges between 2:1 to 1.5:1.

15. The method of claim 6 wherein in step f), said area of land has a slope gradient ranging from 6:1 to 1:1.

16. The method of claim 15 wherein in step e), (ii), said organic material weighs between 1000 pounds to 1200 pounds; and wherein in step f), said slope gradient ranges form 5:1 to 4:1.

17. The method of claim 15 wherein in step e),(ii), said organic material weighs between 1000 pounds to 1500 pounds; and wherein in step f), said slope gradient from 4:1 to 3:1.

18. The method of claim 15 wherein in step e), (ii), said organic material weighs between 1200 pounds to one ton; and wherein in step f), said slope gradient ranges from 4:1 to 2:1.

19. The method of claim 18 wherein in step e), (ii), said organic material weighs between 1200 pounds and 1500 pounds.

20. The method of claim 19 wherein in step f), said slope gradient ranges from 3:1 to 2:1.

21. The method of claim 18 wherein in step e), (ii), said organic material weighs between 1500 pounds to one ton; and wherein in step f), said slope gradient ranges from 3:1 to 1.5:1.

22. The method of claim 7 wherein in step d), (i), said organic material weighs at least 1000 pounds; and wherein in step d), (ii), the combined weight of the copolymer and organic material ranges from at least approximately 1002.5 pounds to one ton.

23. The method of claim 22 wherein in step e), said area of land has a slope gradient ranging from 6:1 to 1.5:1.

24. The method of claim 23 wherein in step e), said slope gradient ranges from 5:1 to 1.5:1.

25. The method of claim 24 wherein in step e), said slope gradient ranges from 4:1 to 2:1.

26. The method of claim 25 wherein in step d), (i), the combined weight of the copolymer and organic material ranges from at least approximately 1002.5 to 1503.75 pounds.

27. The method of claim 26 wherein in step d), (i), the combined weight of the copolymer and organic material ranges from at least 1203 to 1503.75 pounds.

28. The method of claim 27 wherein in step e), said slope gradient ranges from 4:1 to 2:1.

29. The method of claim 28 wherein in step e), said slope gradient ranges from 3:1 to 2:1.

30. The method of claim 22 wherein in step d), said water is mixed with said copolymer before being mixed with said organic material.

31. The method of claim 23 wherein in step d), said water is mixed with said copolymer before being mixed with said organic material.

32. The method of claim 24 wherein in step d), said water is mixed with said copolymer before being mixed with said organic material.

33. The method of claim 24 wherein in step d), said water is mixed with said copolymer before being mixed with said organic material.

34. The method of claim 25 wherein in step d), said water is mixed with said copolymer before being mixed with said organic material.

35. The method of claim 26 wherein in step d), said water is mixed with said copolymer before being mixed with said organic material.

36. The method of claim 27 wherein in step d), said water is mixed with said copolymer before being mixed with said organic material.

37. The method of claim 8 wherein in step c), said polymer is present in an amount from 1.25 percent to 5.00 percent by weight of the combined weight of said copolymer and said organic material.

38. The method of claim 8 wherein in step e), said polymer is present in an amount from 0.25 percent to 1.25 percent by weight of the combined weight of said copolymer end said organic material.

39. The method of claim 8 wherein in step f), said area of land has a gradient ranging from 6:1 to 1:1.

40. The method of claim 39 wherein in step e), said organic material weighs between 1500 pounds to one ton and said gradient ranges from 3:1 to 1.5:1.

41. The method of claim 40 wherein in step f), said gradient ranges from 3:1 to 2:1.

42. The method of claim 41 wherein in step e), said organic material weighs between 1200 and 1500 pounds; and wherein in step f), said slope gradient ranges from 4:1 to 2:1.

43. The method of claim 42 wherein in step f), said slope gradient ranges from 4:1 to 3:1.

44. The method of claim 42 wherein in step f), said slope gradient ranges from 3:1 to 2:1.

45. The method of claim 8 wherein in step e), said organic material weighs between 1000 to 1200 pounds; and wherein in step f), said area of land has a slope gradient ranging from 6:1 to 4:1.

46. The method of claim 45 wherein in step f), said slope gradient ranges from 5:1 to 4:1.

47. The method of claim 46 wherein in step f), said slope gradient is 4:1.

* * * * *